United States Patent [19]

Yamada

[11] Patent Number: 4,491,864
[45] Date of Patent: Jan. 1, 1985

[54] COLOR SEPARATION CONDITION SELECTING MEANS FOR A PICTURE SCANNING AND RECORDING MACHINE

[75] Inventor: Mitsuhiko Yamada, Kyoto, Japan

[73] Assignee: Dainippon Screen Seizo Kabushiki Kaisha, Kyoto, Japan

[21] Appl. No.: 401,512

[22] Filed: Jul. 26, 1982

[30] Foreign Application Priority Data

Jul. 31, 1981 [JP] Japan .................................. 56-119243

[51] Int. Cl.³ .................................................. G03F 3/08
[52] U.S. Cl. ........................................ 358/80; 358/75
[58] Field of Search ............................ 358/75, 76, 80; 346/712, 701, 703; 307/449, 463; 364/801–803

[56] References Cited

U.S. PATENT DOCUMENTS 4,176,287 4/1978 Remedi .............................. 307/463
4,339,517 7/1982 Akimoto ............................ 355/38

Primary Examiner—John C. Martin
Assistant Examiner—Erin A. McDowell
Attorney, Agent, or Firm—Zarley, McKee, Thomte, Voorhees & Sease

[57] ABSTRACT

Color separation condition selecting means for setting up color separation conditions to a picture scanning and recording machine such as a color scanner and a color facsimile, wherein input means inputs factors for determining color separation conditions, processing means selectively outputs the most proper color separation conditions or a symbol representing those depending on the input factors, and output means outputs the selected result of the processing means, and wherein the processing means possesses a construction corresponding to a decision tree which is composed of the input factors and the color separation conditions resulting from the input factors.

4 Claims, 7 Drawing Figures

COLOR SEPARATION CONDITION SELECTING MEANS FOR A PICTURE SCANNING AND RECORDING MACHINE

BACKGROUND OF THE INVENTION

The present invention relates to color separation condition selecting means for a picture scanning and recording machine such as a color scanner and a color facsimile, and more particularly relates to means for selecting color separation conditions such as a highlight point, a shadow point, gradation control, color correction, under color removal, sharpness control, and so forth, to be set up to the picture scanning and recording machine.

In a conventional color scanner, when an original picture is color-separated, since color separation conditions depend on color balance condition of an original picture to be color-separated, highlight and shadow densities, and so forth, together with demands of clients, the color separation conditions are usually set up according to the operator's experiences and skills by adjusting dials of the color scanner.

However, the setup of the color separation conditions concerning the demands of the clients, seasonable objects such as autumn tints and cherry blossoms, memorial objects such as skin color of human being, grass blades and the sky, and the like, is very difficult, and therefore, in practice, the color separation conditions are set up under observing a monitor such as a CRT display in which the output reproduction pictures of the color scanner are displayed.

Further, unexpected reproduction pictures are often obtained by the misjudge or the mistake of the operator, difference of characteristics of each color scanner, and so forth.

In order to remove such disadvantages and inconveniences and to minimize the manual operation of the operator, color separation condition selecting means has been developed. In this case, the color separation condition data of each original picture is input to a computer which performs an arithmetic operation to output the color separation conditions, and then the dials for the color separation condition control of the color scanner are adjusted manually or automatically depending on thus the obtained color separation conditions.

This color separation condition selecting means is effective. However, this means is generally large-scaled and hence expensive and costly. A relatively small-sized and low-priced means of this kind is disclosed in Japanese patent Laying-Open specification No. 55-79448 (Japanese patent application No. 53-155954). This means is efficacious for setting up the color separation conditions and is small and low-priced, but it still uses a micro computer.

SUMMARY OF THE INVENTION

It is an object of the present invention to provide color separation condition selecting means for a picture scanning and recording machine such as a color scanner and color facsimile, free from the aforementioned disadvantages, which is compact and low-priced, and is simple in construction such as composed of a combination of simple arithmetic devices or modules, without need of a micro computer which requires a programming operation.

According to the present invention there is provided color separation condition selecting means for a picture scanning and recording machine, comprising input means which inputs factors for determining color separation conditions, processing means which selectively outputs the most proper color separation conditions or a symbol representing the color separation conditions depending on the input factors, and output means which outputs the selected result of the processing means, the improvement in that the processing means possesses a construction corresponding to a decision tree Which is composed of the input factors and the color separation conditions resulting from the input factors.

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENTS

When an original picture is color-separated, the following factors on which color separation conditions to be set up to a color scanner by using dials, depend, may be considered.

(1) Type of film;
(2) Kind of object;
(3) Whole tone such as high, normal or low key:
(4) Density range;
(5) Color balance;
(6) Clients' demands;
(7) Intention of operator;
(8) Line of plate making company;
(9) Characteristic of color scanner;
(10) Type of plate making and printing such as type of plate; offset, gravure and letterpress, and machine; sheet-fed press and rotary press;
(11) Selection of highlight and shadow points;
(12) Density of color correction part of original picture;
(13) Gradation control effect of brighter part than highlight point, catchlights, and darker part than shadow point;
(14) Purpose of printing;
(15) Color separation number such as four or three colors;
(16) Size of original copy;
(17) Magnification of enlarged or reduced;

(18) Scanning line number;
(19) Negative or positive of color separation plates;
(20) Quality of printing paper;
(21) Screen ruling; and
(22) Others.

One embodiment of color separation condition selecting means which determines color separation conditions to be set up to the color scanner from the factors tabulated in the above three terms (1), (2) and (3), will be described.

Figure 1:
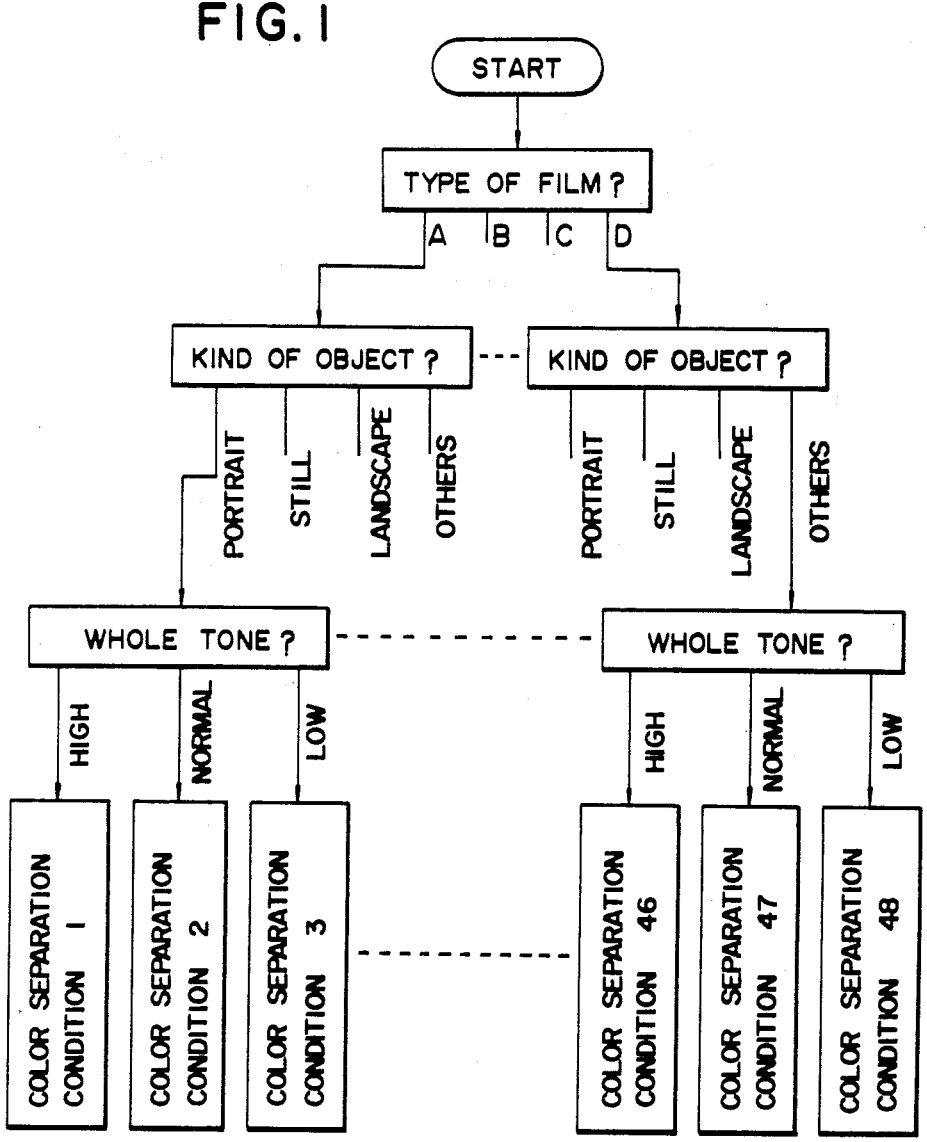
FIG. 1 shows one embodiment of a three-stage decision tree wherein the decision of conditions is performed in three stages according to the present invention.

In FIG. 1 there is shown one embodiment of a three-stage decision tree according to the present invention, the first stage selecting the color separation conditions depending on the type of the film of the original picture, the second stage selecting the color separation conditions depending on the kind of the object photographed, such as a portrait, a still, a landscape and others, and the third stage selecting the color separation conditions depending on the whole tone of the original picture. The number of stages depends on the number of the factors tabulated above.

Figure 2:
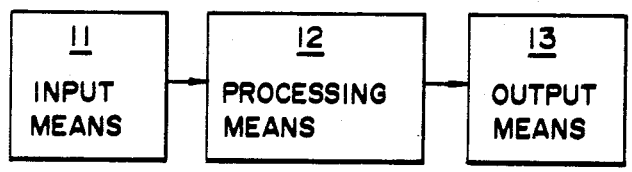
FIG. 2 is a block diagram of means for carrying out the decision tree of FIG. 1.

In FIG. 2 there is shown means for carrying out the decision tree of FIG. 1, which comprises input means 11 such as switches or a key board, for setting up the characteristic of the original color picture, a processing means 12 such as a decoder or a table, for selecting the most proper color separation conditions depending on the characteristic of the original color picture, and output means 13 having a display function such as a luminescent semiconductor diode, a tubular bulb light source, a plasma display or a CRT display, for outputting the most proper color separation conditions selected by the processing means. Another output means which performs automatically the setup of the color separation conditions to the color scanner, such as a paper tape, a magnetic card, a magnetic tape, or the like, can be used as the output means 13. A wire cable for directly controlling the color separation conditions of the color scanner can be used as the output means 13, as well.

Figure 3:
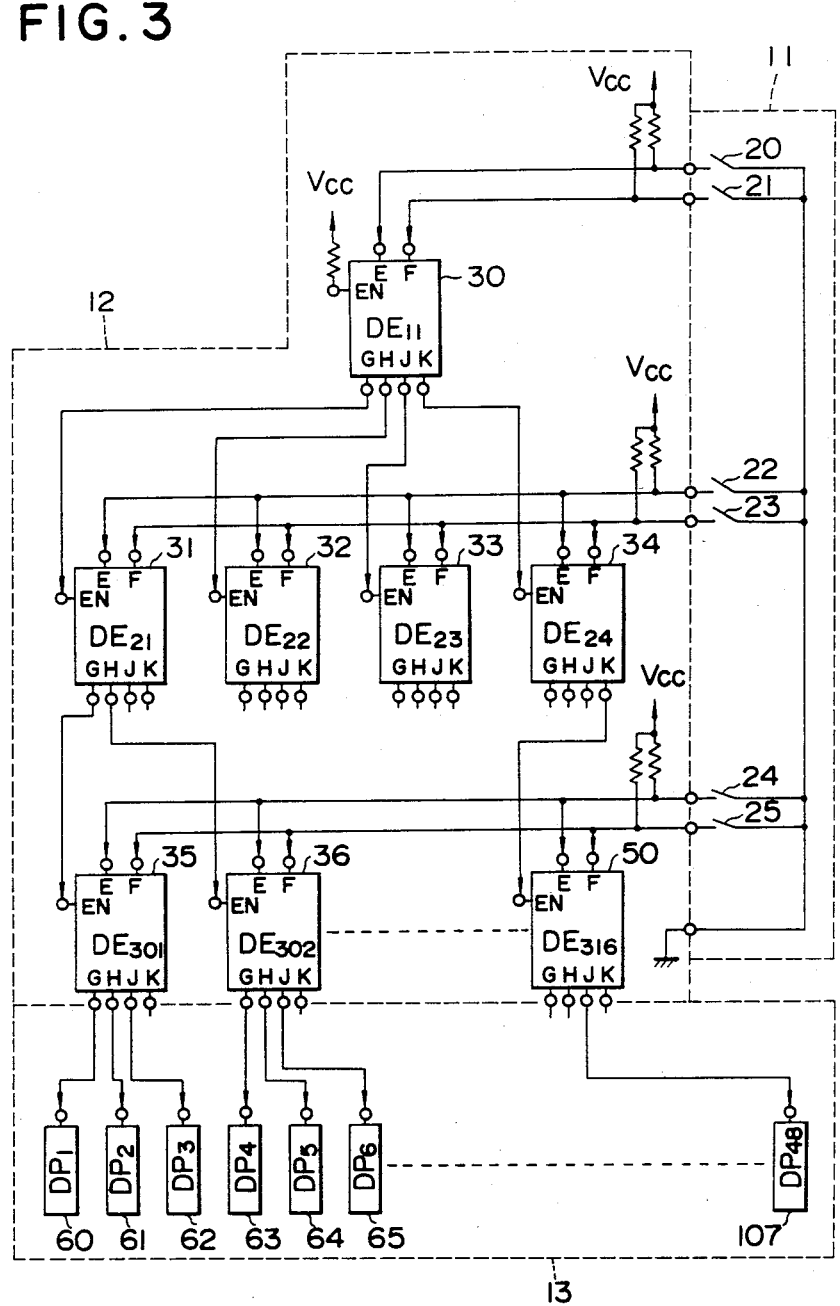
FIG. 3 shows one embodiment of a circuit of color separation condition selecting means of FIG. 2, which is composed of modules or devices, each comprising a transistor-transistor logic.

In FIG. 3 there is shown one embodiment of color separation condition selecting means of FIG. 2, which comprises a combination of modules or devices, each comprising a transistor-transistor logic. The input means is composed of three pairs of switches 20-25, each pair for each selection theme because of three themes, each having at most four selection items.

The processing means 12 comprises 21 decoders 30-50, each comprising the module or the device. The output means 13 comprises 48 displays 60-107, and one of these displays 60-107 is selectively displayed. In this embodiment, if the same color separation conditions exist, as a matter of practice, the number of the different color separation conditions can be reduced.

The operation of the color separation condition selecting means of FIG. 3 will be described in connection with the decision tree of FIG. 1.

The decoder 30 functions as the first stage for inputting the type of the original film, and is adapted to be operated as follows. For example, when the film A, B, C or D is selected, both the switches 20 and 21 are off, only the switch 20 is on, only the switch 21 is on, or both the switches 20 and 21 are on, respectively, and thereby the decoder 30 outputs a high level signal at the output terminal G, H, J or K connecting to an enable terminal of the decoder 31, 32, 33 or 34 for the second stage in order to activate the decoder 31, 32, 33 or 34.

In the second stage, the kind of object photographed is selected by the decoders 31-34. When the portrait, the still, the landscape or the other is selected, both the switches 22 and 23 are off, only the switch 22 is on, only the switch 23 is on, or both the switches 22 and 23 are on, respectively, with the result that the activated decoder 31, 32, 33 or 34 outputs a high level signal at its output terminal G, H, J or K which is connected to an enable terminal of one of the decoders 35-50 in order to activate the one decoder. When the film A and the still are selected at the first and the second stages, the decoders 31 and 36 are actuated.

In the third stage, the whole tone of the original picture, such as the high, the normal or the low key, is selected by the decoders 35-50. When the high, the normal or the low key is selected, both the switches 24 and 25 are off, only the switch 24 is on, or only the switch 25 is on, respectively, resulting in that the activated one of the decoders 35-50 outputs a high level signal at its output terminal G, H or J which is connected to one of the displays 60-107 in order to activate the one decoder. When the low key is selected, while the decoder 36 is actuated, the display 65 is selected so as to display the selection of the color separation condition 6 thereon.

Although the type of the film, the kind of the object photographed and the whole tone of the original picture are input to the input means 11, however, the number of the selection factors can be varied, as occasion demands. Further, the order of the selection of the factors can be varied freely. In other words, the color separation conditions are indirectly given by specifying the combination of the selection factors of the characteristics of the original color picture, and hence the color separation conditions to be set up to the color scanner by adjusting the dials are determined optionally by the user.

Figure 4:
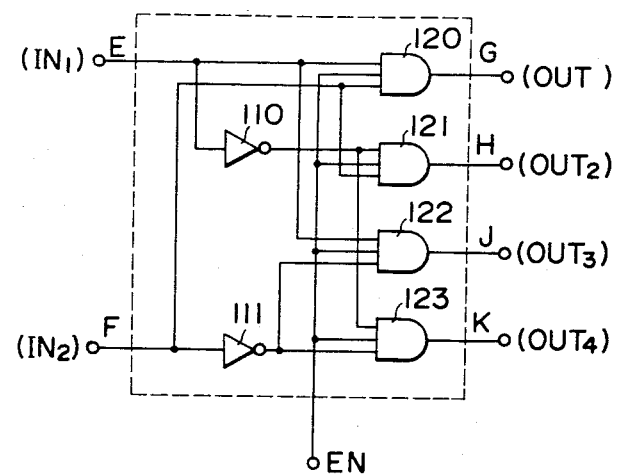
FIG. 4 shows one embodiment of a circuit of a module or device having four kinds of input conditions.

In FIG. 4 there is shown the module or the device used as the decoders 30-50 in FIG. 3, having four kinds of input conditions, i.e. $2^2$ number of conditions, which is capable of performing at most four kinds of input conditions.

The module or the device of FIG. 4 comprises two inverters 110 and 111, and four AND gates 120-123 connected thereto. Its operation is as follows. That is, in order to actuate this decoder, the high level signal is input to the enable terminal, otherwise, when the low level signal is fed to the enable terminal, the output terminals G, H, J and K are kept to the low level. Then, while the enable terminal is at the high level, the input terminals E and F are varied.

When the input terminals E and F are at the high level, all three input terminals of the AND gate 120 are at the high level, and thus the output terminal G becomes at the high level. When the input terminal E is at low level and the input terminal F is at the high level, all the input terminals of the AND gate 121 are at the high level, and accordingly its output terminal H becomes at the high level. When the input terminal E is at the high level and the input terminal F is at the low level, all the input terminals of the AND gate 122 are at the high level, and thus the output terminal J becomes at the high level. Further, when the input terminals E and F are at the low level, all the input terminals of the AND gate 123 become at the high level, and therefore the output terminal K becomes at the high level.

It is readily understood from the above description that, when the enable terminal is at the high level, the decoder outputs the high level signal at one of the output terminals G–K depending on the conditions of the input terminals E and F. In general, signals $2^0$ and $2^1$ are fed to the input terminals E and F, respectively, with the result of the output signal 1–4. Hence, the input signals and the output signals are forced to correspond to the inherent characteristics of the original picture and the color separation conditions, respectively.

In this embodiment, the module or the divice comprises the transistor-transistor logic, but it can be composed of a combination of transistors, diodes, FET (field-effect transistor), and other semiconductors. Further, MSI (medium-scale integration) such as a type SN74LS139 made by Texas Instruments Incorporated, having the same function as the above, or a logic device such as MOS (metal oxide semiconductor device) or CMOS (complementary metal oxide semiconductor device) may be used instead.

Figure 5:
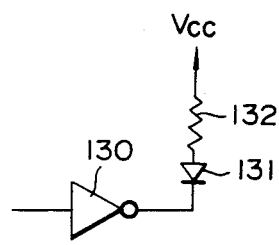
FIG. 5 shows one embodiment of a circuit of output means of FIG. 2.

In FIG. 5 there is shown one embodiment of the output means 13 comprising a luminescent semiconductor diode, which displays the selected part of the board on which the color separation conditions or the symbols indicating the color separation conditions are expressed.

The output means 13 comprises a switching element 130 such as an inverter, a luminescent semiconductor diode 131 connected thereto, and a protection resistor 132 connected in series thereto. In this embodiment, when the input of the inverter 130 is low level, its output is high level, and thus the luminescent semiconductor diode 131 does not illuminate.

When the high level signal output from the decoder of FIG. 4 is input to the inverter 130, it outputs a low level signal, and therefore the luminescent semiconductor diode 131 illuminates, thereby displaying the color separation conditions selected.

In this case, because of the low cost, the luminescent semiconductor diode is used in the output means, but, of course, the plasma display or the CRT display can be used instead. The output of the decoder may be recorded by means of the magnetic card, magnetic tape or the paper tape, and then the color separation conditions can be set up to the color scanner by using this intermediate medium. Further, by means of the wire cable connected to the color scanner, the color separation conditions to be set up to the color scanner can be controlled.

Figure 6:
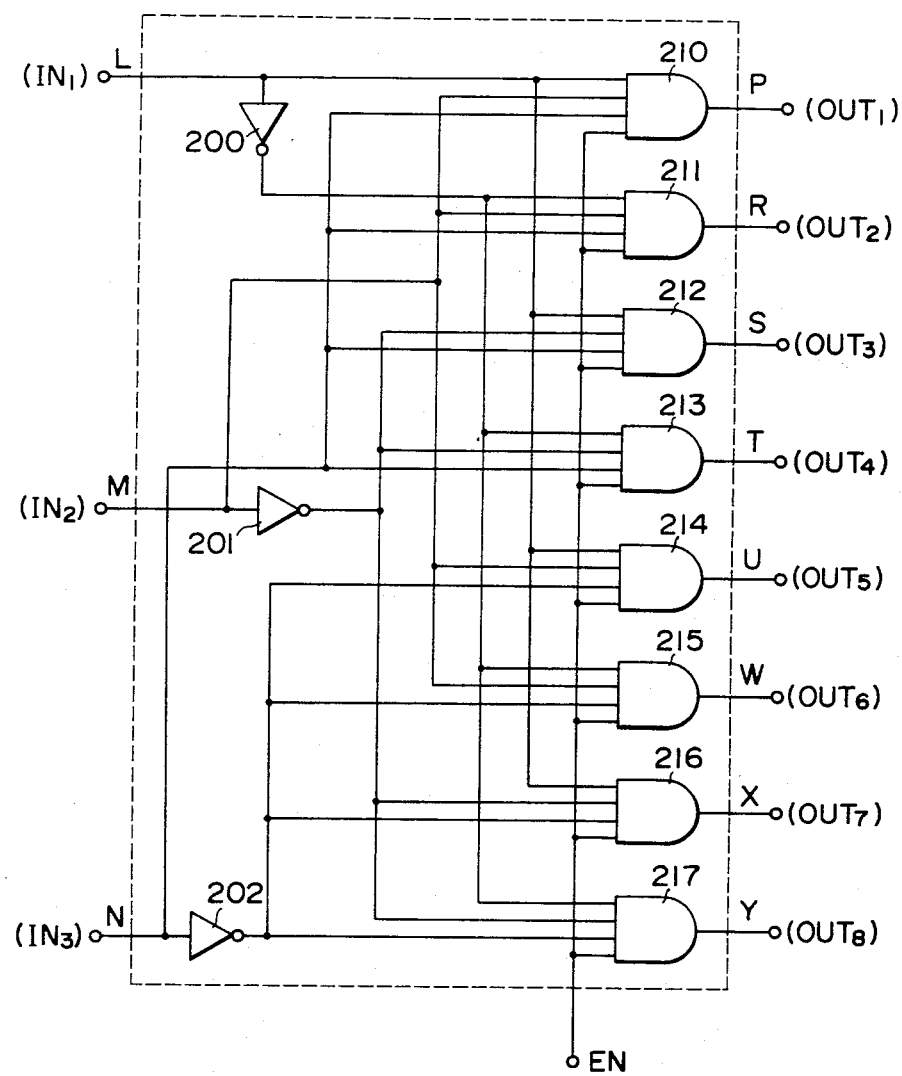
FIG. 6 shows one embodiment of a circuit of a module or device having eight kinds of input conditions.

In FIG. 6 there is shown another embodiment of the module or the device of FIG. 3, having eight kinds of input conditions, i.e. $2^3$ number of input conditions, which is capable of carrying out at most eight kinds of input conditions, as a decoder.

This module or device comprises three inverters 200–202, and eight AND gates 210–217 connected thereto. When this decoder is actuated, the high level signal is input to the enable terminal. When the enable terminal is at the low level, output terminals P, R, S, T, U, W, X and Y are maintained at the low level. Hence, the high level signal is input to the enable terimal, and input terminals L, M and N are varied.

When the input terminals L, M and N are all at the high level, only all four input terminals of the AND gate 210 become at the high level, and its output terminal P becomes at the high level. When the input terminal L is at the low level and the input terminals M and N are at the high level, all four input terminals of the AND gate 211 become at the high level, and its output terminal R becomes at the high level.

When the input terminal M is at the low level and the input terminals L and N are at the high level, all four input terminals of the AND gate 212 become at the high level, and its output terminal S becomes at the high level. When the input terminals L and M are at the low level and the input terminal N is at the high level, the four input terminals of the AND gate 213 become at the high level, and its output terminal T becomes at the high level.

When the input terminals L and M are at the high level and the input terminal N is at the low level, the four input terminals of the AND gate 214 become at the high level, and its output terminal U becomes at the high level. When the input terminals L and N are at the low level and the input terminal M is at the high level, the four input terminals of the AND gate 215 become at the high level, and its output terminal W becomes at the high level.

When the input terminal L is at the high level and the input terminals M and N are at the low level, the four input terminals of the AND gate 216 become at the high level, and thus its output terminal X becomes at the high level. When the input terminals L, M and N are all at the low level, the four input terminals of the AND gate 217 become at the high level, and its output terminal Y becomes at the high level.

Figure 7:
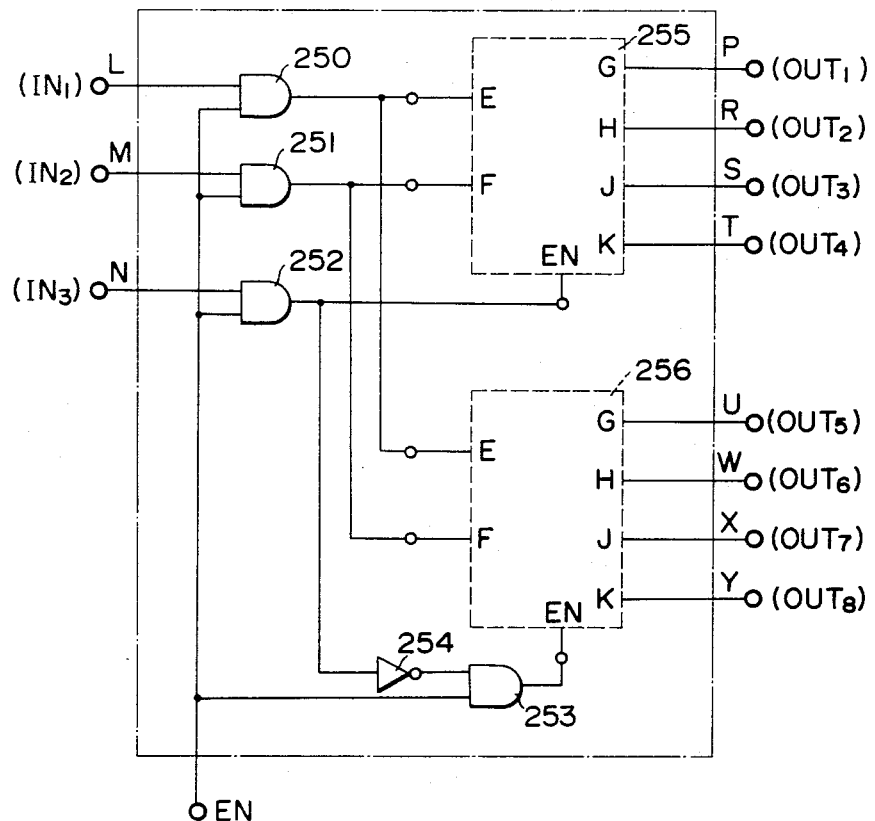
FIG. 7 shows one embodiment of a circuit having the same functions as those of FIG. 6, which comprises the modules or devices shown in FIG. 4.

In FIG. 7 there is shown still another embodiment of the module or device (the decoder), having the same functions as that of FIG. 6, which is constructed by using the module or device shown in FIG. 4.

This decoder comprises AND gates 250–253, an inverter 254, and the modules 255 and 256 which have the same construction and functions as that of FIG. 4.

When this decoder is activated, the high level signal is input to the enable terminal, and when the enable terminal is at the low level, the output terminals P, R, S, T, U, W, X and Y are all at the low level. Then, the high level signal is input to the enable terminal, and the input terminal L, M and N are varied.

While the enable terminal is at the high level, when the input terminal N is at the high level, the high level signal is fed to the enable terminal of the module 255, with the result of the activation thereof, but the high level signal is inverted to the low level in the inverter 254. The inverted low level signal is sent to the enable terminal of the module 256 via the AND gate 253, while the high level signal is fed to the AND gate 253, and therefore the module 256 is not activated. On the other hand, when the low level signal is fed to the input terminal N, while the high level signal is input to the enable terminal, the enable terminal of the module 255 is at the low level and the enable terminal of the module 256 is at the high level, resulting in that only the module 256 is actuated.

Accordingly, when the input terminals L, M and N are at the high level, the input terminals E and F of the module 255 become at the high level, as described above, and hence the output terminal P becomes at the high level. When the input terminal L is at the low level and the input terminals M and N are at the high level, the output terminal R becomes at the high level, in the same manner as above. When the input terminals L and N are at the high level and the input terminal M is at the low level, the output terminal S becomes at the high level. When the input terminals L and M are at the low level and the input terminal N is at the high level, the output terminal T becomes at the high level.

When the input terminal N is at the low level, only the module 256 is actuated, as described above. When the input terminals L and M, i.e. the input terminals E and F of the module 256, are at the high level, the output terminal U is at the high level. Hence, when the input terminal L and N are at the low level and the input terminal M is at the high level, the output terminal W becomes at the high level. When the input terminal L is at the high level and the input terminals M and N are at the low level, the output terminal X becomes at the high level. When the input terminals L, M and N are all at the low level, the output terminal Y becomes at the high level.

It is readily understood from the above description that the decoders of FIGS. 6 and 7 have the same functions. The device having the same functions as these decoders is available, such as the MSI of types SN74LS137 and SN74LS138 manufactured by Texas Instruments Incorporated. Hence, depending on the number of the input conditions, proper basic modules or devices are selected, and the desired decision tree can be made.

According to the present invention the following results and effects can be obtained by the color separation condition selecting means described above.

(1) The compact and low-priced means can be manufactured.

(2) The construction of the decision tree can be freely changed, and thus the desired decision tree can be composed at a user's will. Accordingly, the decision tree of the minimum or the essential input conditions is first constructed, and then the supplementary conditions can be added by the user, as occasion demands.

(3) Since the operation is automatically and theoretically performed instead of the operator's experiences and skills, the stable and reliable color separation condition setup can be performed.

(4) Even if not all conditions can be determined by the present means but almost all conditions can be determined, the remaining undetermined condition or conditions can be readily decided by the operator's judgement.

(5) An inexperienced person can select the right color separation conditions after a short period of study.

(6) No programing step is necessary.

Although the present invention has been described in some detail by way of illustration and example for purposes of clarity of understanding, it will, of course, be understood that various changes and modification may be made in the form details, and arrangements of the parts without departing from the scope of the present invention.

What is claimed is:

1. Color separation condition selecting means for a picture scanning and recording machine, comprising input means which inputs factors for determining color separation conditions, processing means which selectively outputs an enable signal to enable a device for generating the proper signal representing the color separation conditions depending on the input factors, and output means which outputs the selected result of the processing means, the improvement in that the processing means possesses a construction corresponding to a decision tree which is composed of the input factors and the color separation conditions resulting from the input factors.

2. Color separation condition selecting means as defined in claim 1, wherein the processing means comprises modules or devices, each including N number of input terminals, which is based on the output factors $2^N$, an enable terminal for receiving a signal for activating said module or device, and $2^N$ number of output terminals, and outputting one of the output terminals depending on the input factors.

3. Color separation condition selecting means as defined in claim 2, wherein N equals two.

4. Color separation condition selecting means as defined in claim 2, wherein N equals three.

* * * * *